United States Patent [19]
Dreschel

[11] Patent Number: 4,926,585
[45] Date of Patent: May 22, 1990

[54] PLANT NUTRIENT DELIVERY SYSTEM HAVING A POROUS TUBULAR MEMBER

[75] Inventor: Thomas W. Dreschel, Titusville, Fla.

[73] Assignee: The Bionetics Corporation, Hampton, Va.

[21] Appl. No.: 179,036

[22] Filed: Apr. 7, 1988

Related U.S. Application Data

[63] Continuation-in-part of Ser. No. 21,448, Mar. 4, 1987, abandoned.

[51] Int. Cl.$^5$ ............................................. A01G 31/02
[52] U.S. Cl. ........................................ 47/64; 47/61; 47/58
[58] Field of Search .......................... 47/59, 58, 62–65, 47/48.5, 60, 61, 80, 81, 82

[56] References Cited

U.S. PATENT DOCUMENTS

| | | | |
|---|---|---|---|
| 3,766,684 | 10/1973 | Kato | 47/62 |
| 3,882,634 | 5/1975 | Dedolph | 47/65 |
| 3,946,762 | 3/1976 | Green | 47/48.5 |
| 4,235,561 | 11/1980 | Peterson | 47/48.5 |
| 4,310,990 | 1/1982 | Payne | 47/62 |

FOREIGN PATENT DOCUMENTS

| | | | |
|---|---|---|---|
| 2528748 | 12/1976 | Fed. Rep. of Germany | 47/80 |
| 2113512 | 8/1983 | United Kingdom | 47/64 |

OTHER PUBLICATIONS

Dreschel, et al.; Porous Membrane Utilization in Plant Nutrient Delivery; 1987; Paper No. 87-4025 to ASAE Space Life Sciences Training Program, The Bioteniics Corp.; 1987.
Dreschel, et al.; Development of a Membrane Nutrient System; 1987; Paper at Space Life Sciences Symposium; Mott Metallurgical Corp.
Engineering with Precision Porous Metals, Norton Co. Catalog, 1985, Porex Technologies Catalog.
Dreschel, T. W., The Results of Tubular Membrane Experiment TGA; 1987; NASA Contract Report.
Wright, B. D. and W. C. Bausch: A plant growth system for orbital plant experiments; 1984; Winter meeting of the American Society of Agricultural Engineers, New Orleans, LA; Paper No. 84-2524.
Wright, B. D.: A Hydroponic Method for Plant Growth in Microgravity; 1984; 35th Congress of the International Astronautical Federation, Lausanne, Switzerland; Paper No. A85-13292.
Smith, G. A.; Comparative and morphological study of the radish root system; 1985; In Biological and Medical Experiments on the Space Shuttle 1981-1985, Life Sciences Division, Office of Space Science and Application, NASA Headquarters, Washington, DC.
Tarasenko, V. A.; The ultrastructure of the root cap of Arabidopsis plants under normal conditions and microgravity; 1985; NASA contractor report.
Abilov et al.; Morphological and functional state of the photosynthesis system of plant cells grown for varying periods under space flight conditions; 1985; NASA contractor report.
Aliyev, et al.; Modifications by alpha-tocopherol of the mutational process in Welsh onion seeds exposed to long-term space flight; 1985; NASA contractor report.
Berkovich et al.; Greenhouses with curved planting surfaces; 1985; NASA Contractor report.
Merkis et al.; Gravitational sensitivity and growth of plants in weightlessness; 1985; NASA contractor report.
Evans, M. L. et al.; Induction of curvature in maize roots by assymetric tip application of cations; 1986; Paper presented to the American Society for Gravitational and Space Biology, Second Annual Meeting, Charlottsville, VA.

*Primary Examiner*—Danton D. DeMille
*Attorney, Agent, or Firm*—Larson and Taylor

[57] ABSTRACT

A tubular membrane plant growth unit is described. The unit includes a tubular pipe with an opening in its wall. A tubular porous member is situated inside of the pipe. The member and pipe are arranged to provide a space between them for a seed to be positioned so that the stem of the plant grows outwardly through the opening and the roots of the plant grow in the space between the member and pipe. The unit is useful for hydroponic growth of the plant.

33 Claims, 6 Drawing Sheets

PLANT NUTRIENT DELIVERY SYSTEM HAVING A POROUS TUBULAR MEMBER

This application is a continuation-in-part application of my patent application Ser. No. 07/021,448, filed March 4, 1987, now abandoned and owned by the same assignee.

The present invention relates to the delivery of nutrients to plant roots and, more particularly, relates to an improved apparatus for providing nutrients to plant roots via capillary action through a porous member.

The ability to grow plants under microgravity or low gravity environments is a problem which must be overcome if long-duration space travel or space station work is to become feasible. The use of a microporous membrane to contain water and nutrients is generally known. The invention herein simplifies the previously-known apparatus and provides for large numbers of crop plants to be grown in a limited space. The surface tension of a liquid containing plant nutrients becomes the dominant force in a microgravity environment. Therefore, conventional "hydroponic" methods of supplying nutrients to plant roots are not appropriate as they are dependent upon gravity assisting in the containment of the aqueous solution. Wright and his coworkers have the described a membrane technique in which a hydrophilic material is used to confine the nutrient solution and capillary forces enable the roots to draw the nutrient liquid through the Porous membrane. The work of Wright et al is found in a paper entitled "A Hydroponic Method for Plant Growth in Microgravity", 35th Congress of the International Astronautical Federation, Lausanne, Switzerland; American Institute of Aeronautics and Astronautics, Paper No. IAF-ST-84-05; 1984 and "A Plant Growth System for Orbital Plant Experiments", Winter Meeting of the American Society of Agricultural Engineers, New Orleans, Lousiana, Paper No. 84-2524, 1984.

Wright fabricated his membrane frame in a flat pattern utilizing rigid members. Although the frame could be used in many positions, experience has shown that pressure gradients behind the membrane led to unequal flow, reducing the availability of nutrients to the plant roots. Difficulty has also been found because of the rigid nature of the frame and the method of membrane support. A fairly elaborate system is required to support the membrane, remove air bubbles from the nutrient solution (to avoid dry areas) behind the membrane and maintain uniform membrane pressure on the roots.

The present invention overcomes the pressure and air bubble problems, enables a greater volume of water to flow behind the membrane or porous member and provides a simple system to fabricate and operate. The present invention is relatively simple, relatively low cost and has the advantage of ease of construction using readily available materials and equipment for operation.

According to one aspect of the present invention, we provide an apparatus for hydroponic growth of a plant from seed and a nutrient solution. The apparatus includes a section of rigid tubular pipe having an opening in its wall. A tubular hydrophilic microporous membrane is telescopically received inside of the pipe and the membrane and pipe are constructed and arranged to provide sufficient space between them for a seed to be positioned on the membrane adjacent to the opening so that the stem of the plant can grow through the opening and the roots of the plant can grow in contact with said membrane in the cylindrical space between the membrane and the tubular pipe. Support means are provided telescopically received inside of the membrane to support the membrane in a spaced relationship to the interior surface of the rigid pipe, the pores of the membrane being sized to be sealed by surface tension of the nutrient solution except where roots contact the membrane whereby the nutrient solution flows by capillary action through the membrane to the roots. Finally, there are inlet and outlet means connected to each end of the tubular membrane for receiving and removing a nutrient solution from the inside of the tubular membrane. According to another aspect of the invention, the membrane is of a submicron pore size (about 0.2 to 0.45 micron), is hydrophilic and is made of an acrylic copolymer cast over a non-woven nylon substrate for strength.

According to a further aspect of the invention, the support means for the membrane is a plastic screening which is rolled lengthwise and inserted into the membrane tube.

According to still a further aspect of the invention, a rigid porous material is used instead of a tubular porous membrane and its support means.

According to another aspect of the invention, I provide a pressure monitoring and control system for a plant nutrient delivery system.

The above and other objects and features of the present invention will be apparent from a reading of the following description of the disclosure found in the accompanying drawings and in the appended claims.

BRIEF DESCRIPTION OF THE DRAWINGS

The drawings illustrate preferred embodiments of the present invention and they are briefly as follows.

DETAILED DESCRIPTION OF THE PREFERRED EMBODIMENT

In the drawings, like reference numerals apply to similar parts throughout the several views.

Figures 1, 2:
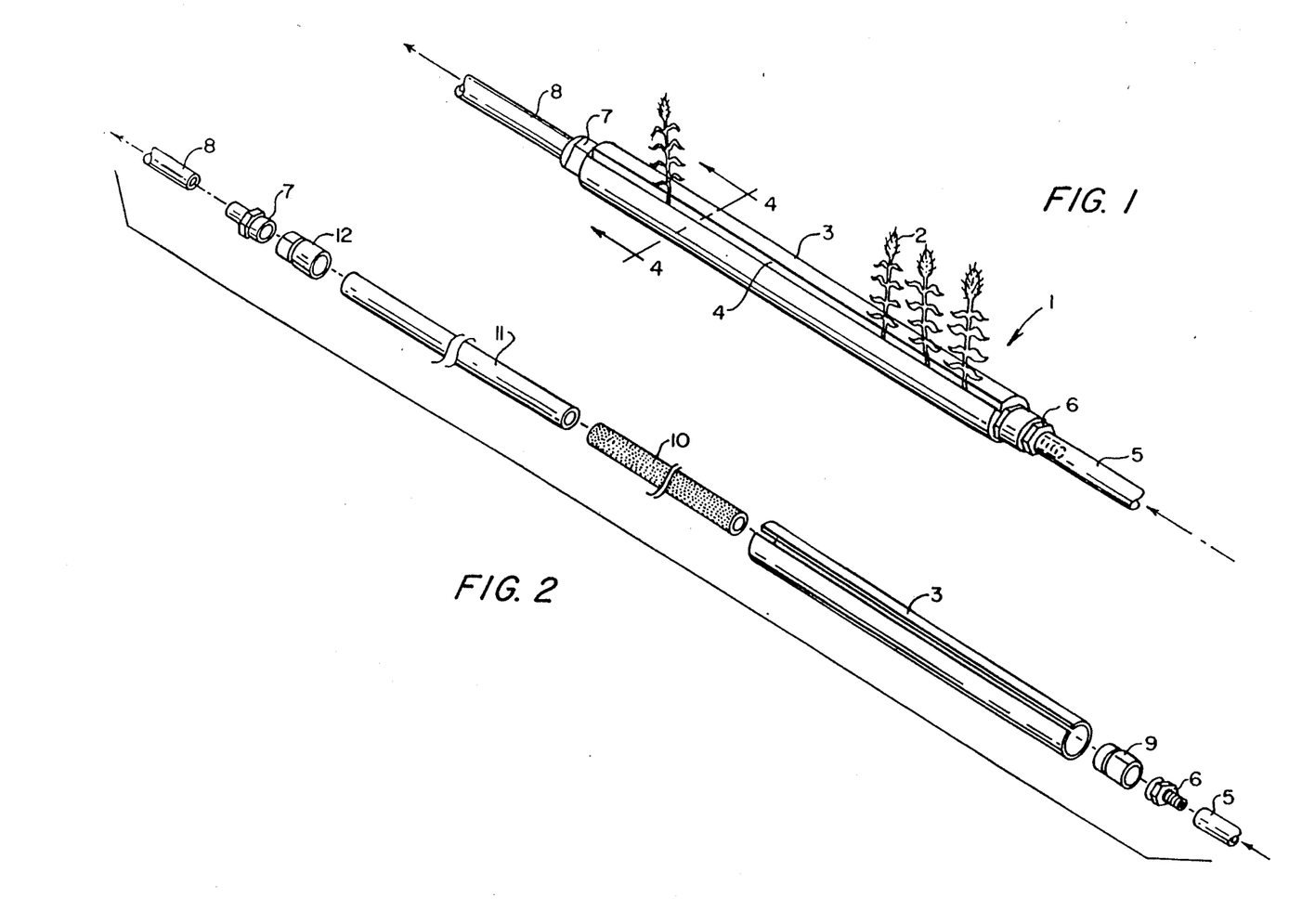
FIG. 1 is a perspective view of the tubular membrane plant growth unit according to one embodiment of the present invention.
FIG. 2 is an exploded view of the apparatus shown in FIG. 1 and illustrates the various parts of the tubular membrane plant growth unit according to one embodiment of the present invention.

FIG. 1 is a view illustrating a single tubular membrane plant growth unit 1 according to one embodiment of the present invention. As shown, growing plants 2 are supported by the unit with their roots being on the interior of a tubular PVC pipe 3, being supported through a longitudinal slot 4. A water and nutrient solution for the plants is received from a reservoir (not shown) from a hose 5 which is attached to a hose nipple fitting 6. The nutrient solution is fed through the length of the plant growth unit 1 and is removed from the unit by way of a hose nipple 7 and hose 8 which is connected to a pump (not shown) which serves to recycle the nutrient solution back to the inlet hose 5.

FIG. 2 shows an exploded view of FIG. 1 showing additional components not illustrated in FIG. 1. Starting at the right hand end of FIG. 2, a section of ¼" hose 5 leads from a reservoir of nutrient solution to a ¾" PVC pipe fitting with a hose nipple (male) which is shown as 6 in FIG. 2. This PVC pipe fitting is threadingly engaged with a ¾" PVC pipe-to- tube fitting (female) which is designated 9 in FIG. 2. In FIG. 2, 3 denotes a section of PVC pipe with a five eighth inch slot cut in its wall along its entire length. In FIG. 2, item 10 denotes a plastic screening or canvas (36 openings/sq. in.) which is rolled lengthwise and inserted into the membrane tube 11 for support. The membrane tube is made of a membrane having a sub-micron pore size (about 0.2 to 0.45 microns), which is hydrophilic and made of an acrylic copolymer cast over a non-woven nylon fabric substrate for strength. Examples of a suitable membrane are those that are known as Versapor 200 and 450 (TM) which are available from Gelman Sciences, 600 South Wagner Road, Ann Arbor, Michigan 48106. The tubular membrane is fabricated by folding and stitching the material to form a tube with a circumference slightly smaller than the surrounding PVC pipe 3. The seam of the membrane tube is sealed with hot melt adhesive. Item 12 in FIG. 2 is a ¾" PVC pipe-to-tube fitting (female) similar to item 9 already described, while item 7 in FIG. 2 is similar to item 6 already described. Finally, a section of ¼" hose 8 is connected to the hose nipple 7 and ultimately connects to a recycling pump.

In the process of assembling the tubular membrane plant growth unit of FIG. 2, the plastic canvas 10 is recessed in about 2 inches from either end of the membrane tube 11. The membrane tube 11 is then inserted into the PVC pipe which is 1 ¼", schedule 40 into which a slot has been cut lengthwise.

The female PVC pipe fittings 9 and 12 (¾", pipe-to-tube, Schedule 40) are then inserted into the ends of the pipe 3 with the ends of the membrane tube 11 extending out of the inside of the female fitting. If desired, the membrane tube 11 can be cemented to the female fittings 9 and 12 with PVC cement. Thereafter, male PVC pipe fittings 6 and 7 (¾", schedule 40) with hose nipples are then inserted into the ends of the membrane tube 11 and threaded into the corresponding female fittings 9 and 12 to seal the ends of the membrane tube 11 thereto. The tubings 5 and 8 are then attached to the male fittings 6 and 7 to connect the growth unit to a pump at one end and the nutrient solution reservoir at the other. In operation, a negative pressure is maintained on the unit by the solution being pulled from the reservoir, through the unit by the pump and then being returned to the reservoir. A slight restriction on the upstream end of the unit maintains this negative pressure.

Figures 3, 4:
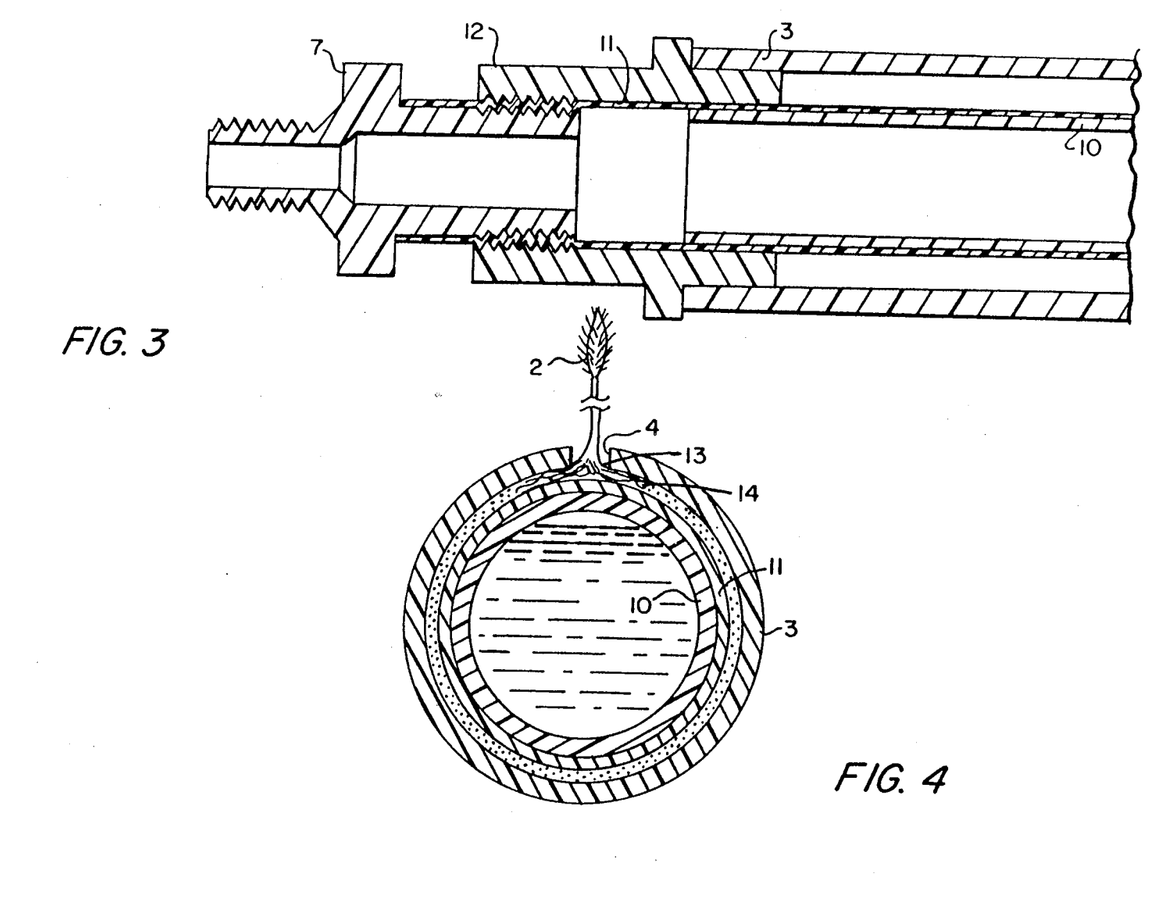
FIG. 3 is an enlarged fragmentary longitudinal cross sectional view of the apparatus of FIG. 1 detailing the features of one end of the plant growth unit according to the one embodiment of the present invention.
FIG. 4 is an enlarged cross sectional view taken along section 4—4 of FIG. 1 and illustrating the arrangement of a plant, including its seed and roots on an apparatus according to one embodiment of the present invention.

FIG. 3 is a cross sectional view taken along the longitudinal axis of the tubular membrane plant unit of FIG. 1. As described, a Versapor (TM) membrane 11 is mounted inside of a 1 ¼" PVC pipe 3 and is supported therein by plastic canvas 10. The Versapor (TM) membrane extends beyond the end of the PVC pipe 3 into the interior of a ¾" PVC pipe tube fitting 12 and it is secured within fitting 12 by the threaded portion of a PVC pipe fitting 7 which has the hose nipple for connection to the operating hose.

A suitable alternative to the plastic canvas 10 is provided by a rigid tube with openings. Such a tube is a polypropylene extruded tube, 1 inch O.D., with 50 % open area, available from Conwed Plastics, 520 NE Taft Street, Minn., MN 55413.

FIG. 4 is a cross sectional view taken along section 4—4 of FIG. 1 and illustrates how a plant seed may grow through the slot 4 in the PVC pipe 3. The seed 13 of plant 2 is supported adjacent the slot of top of the Versapor (TM) membrane 11 and the roots 14 of the plant grow around the periphery of the membrane 11 as best seen in FIG. 4. It should be apparent that the roots are thereby exposed to the water and nutrient solution which is provided to the interior of the plastic canvas 10 which supports the membrane 11 against the growing roots.

Figures 5, 6, 7:
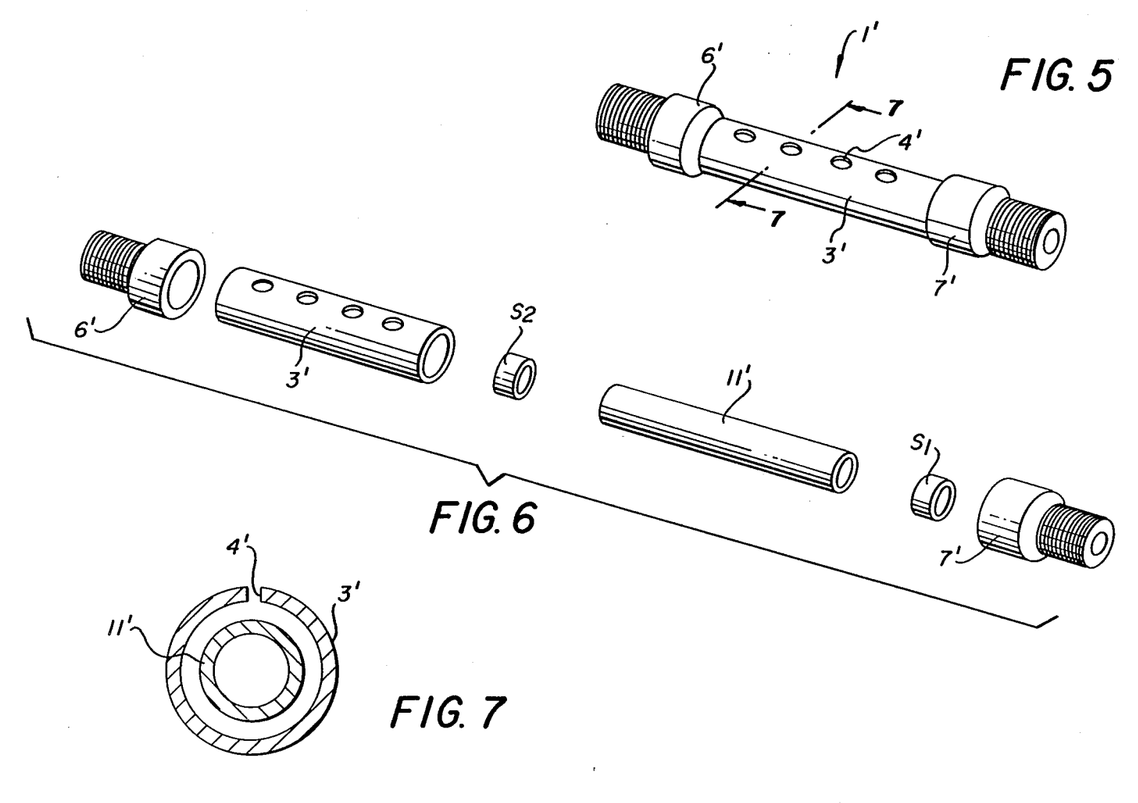
FIG. 5 is a perspective view of a tubular member plant growth unit according to another embodiment of the present invention.
FIG. 6 is an exploded view of the apparatus shown in FIG. 5.
FIG. 7 is an enlarged cross-sectional view taken along section 7—7 of FIG. 5.

FIG. 5 is a view illustrating a single tubular member plant growth unit 1' according to another embodiment of the present invention. In use, growing plants are supported by the unit with their roots being on the interior of a tubular pipe 3', being support there through holes 4'. A water and nutrient solution for the plants is received from a reservoir. The nutrient solution is fed via fitting 6' through the length of the plant growth unit 1' and is removed from the unit by way of a fitting 7' which serves to recycle the nutrient solution.

FIG. 6 shows an exploded view of FIG. 5 showing additional components not illustrated in FIG. 5. Starting at the right hand end of FIG. 6, is a pipe fitting 7' adapted to be connected to the pump and nutrient supply. A rigid tube of porous material 11' is used instead of the membrane tube 11 and plastic canvas 10 shown in FIG. 2. In the process of assembling the tubular member plant growth unit 1' of FIG. 6, the tubular segments act as spacers $S_1$ and $S_2$ and are supported on opposite ends of the rigid tube 11' of porous material which, in turn, are inserted into the solid pipe 3'. The solid tube 3' abuts fittings 6' and 7' while concentric inner tube 11' of porous material has each end inserted into the fittings 6' and 7' for inlet and outlet of the nutrient supply.

FIG. 7 is a cross-sectional view taken along the longitudinal axis of the tubular member plant unit of FIG. 5. As described, a rigid porous tube 11' is mounted inside of a pipe 3'. In FIG. 7, the annular space between the outside of tube 11' and the inside of tube 3' defines the air space for the plant roots which grow around and against the exterior of the rigid porous tube 11' to receive nutrients which pass therethrough from the inner circular cross-sectional area in FIG. 7 where nutrient solution is circulated.

As discussed, in the embodiment of FIGS. 5 through 7, the rigid porous tube 11' is used to replace the tubular membrane 11 and its support 10 of plastic screening or canvas in the embodiment of FIG. 4. Suitable porous rigid materials for tube 11' include porous plastics, porous ceramics and porous metals. The porous tube 11' requires no internal support since it is a relatively rigid tube. These have the additional advantage of being off-the-shelf items from various commercial sources. Examples of suitable rigid porous materials are those that are known as POREX (TM) which are available from Porex Technologies, 7380 Bohannon Road, Fairburn, Georgia 30213. POREX (TM) is a porous plastic available in standard tube form. Another suitable material for the porous tubular member is a porous ceramic known as CERAFLOW (TM) which is available from Norton Company, 70 Pullman Street, Worcester, Mass. 01606. Initial tests indicate that the porous plastics and ceramics identified above are suitable substitutes for porous membranes and they have the advantage of having durability superior to the membrane material. It has been found that plants can be grown in units using rigid porous tubes of porous plastics and ceramics having pores ranging in size from 0.1 to 20 micrometers (microns). Another example of suitable rigid porous tubes are those available from Mott Metallurgical Corporation, Farmington Industrial Park, Farmington, Conn. 06032.

Figure 8:
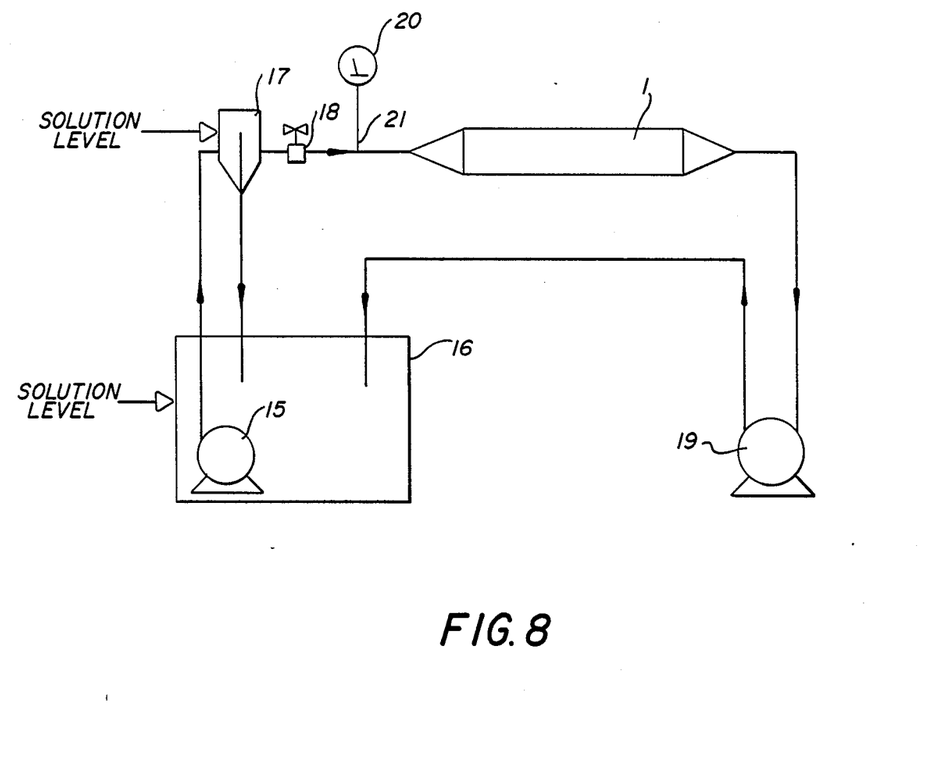
FIGS. 8 and 9 are schematic diagrams of nutrient delivery systems with pressure control and monitoring capabilities.

FIG. 8 is schematic diagram of one configuration of a single tubular membrane unit nutrient delivery system with pressure control and monitoring capabilities. The delivery of nutrients in water to the roots of plants under microgravity will require a system that will enable the operator to monitor and control pressures within the system to an accuracy of inches of water pressure. The present invention utilizes a standpipe concept to bring solution to the level of the plant growth units (overcoming gravitational effects) and uses valves to control the pressure and a part to which a pressure gage or transducer can be attached.

Figure 9:
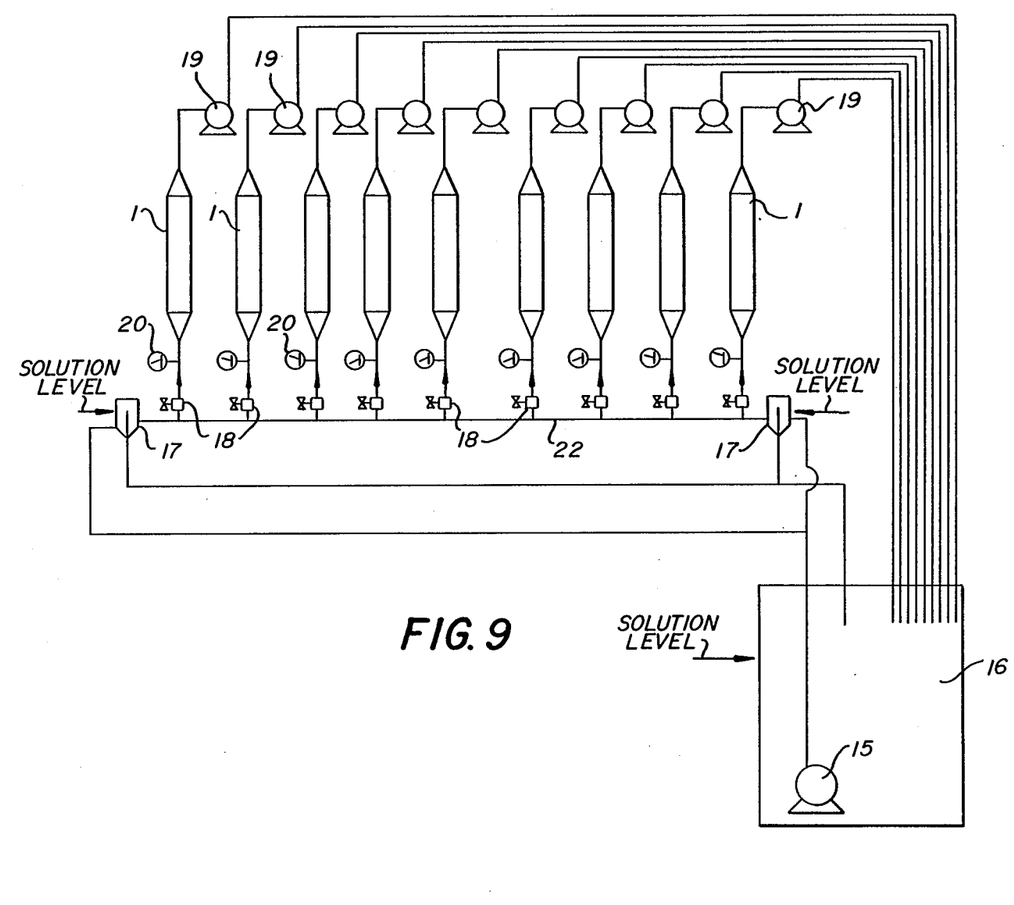

FIG. 9 is a schematic diagram of nine tubular membrane units arranged in a nutrient delivery system with pressure control and monitoring capabilities. FIG. 9 identifies the various components of the system with the same numerals shown in FIG. 8. Systems of FIGS. 8 and 9 are preferably constructed of PVC and CPVC pipe fittings such that a submersible pump 15 lifts nutrient solution from a reservoir 16 to a standpipe 17. The standpipe 17 returns the overflow to the reservoir 16 and provides solution at nearly a zero pressure head to the tubular membrane unit 1 or units 1' via a valve 18. As shown in FIGS. 8 and 9, a positive-displacement pump 19 (peristaltic pump) draws the solution through the units and a negative pressure is exerted by adjusting the valve 18. This pressure can be set using the valve 18 and monitored using a guage 20 attached to a tee 21 between the valve and the tubular membrane unit.

It should be apparent that the size of the manifold 22 is dependent upon the number of units to be operated.

Figure 10:
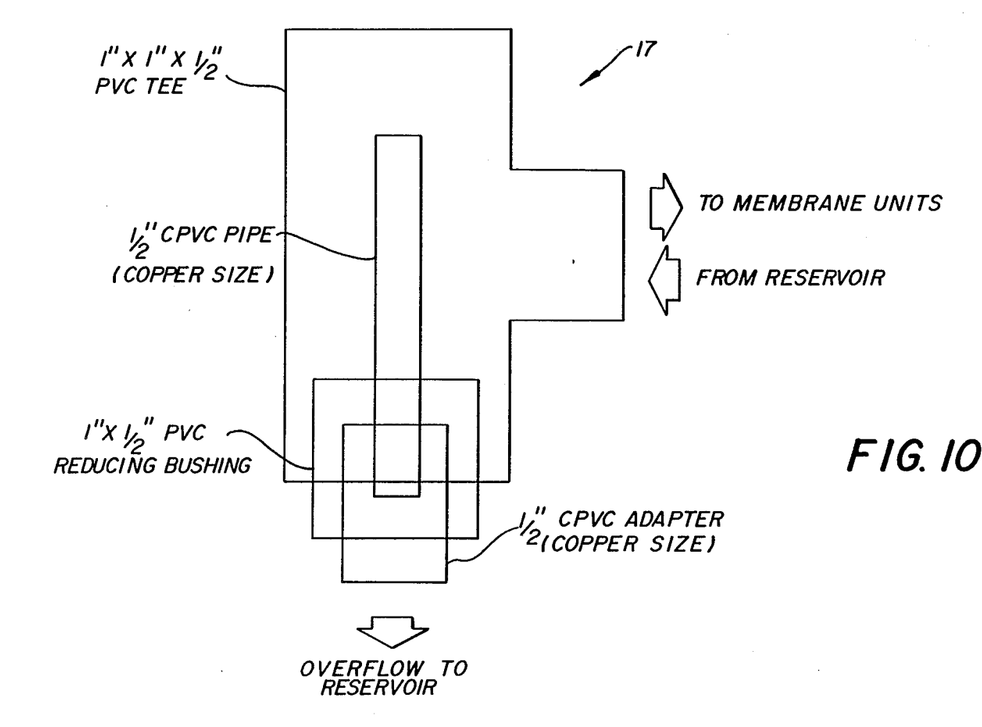
FIG. 10 is a schematic view of the standpipe constructions of FIGS. 8 and 9.

The system illustrated in FIG. 9 is for nine tubular membrane units and the manifold 22 is constructed from one-half inch PVC SLx SLx SL tees attached to two standpipes (17,17) which are constructed from 1"×1"×½" PVC tees as shown in detail in FIG. 10. In operation, the submersible pumps of FIGS. 8 and 9 deliver enough solution to maintain solution in the standpipe 17 and deliver it to the tubular membrane units 1. The peristaltic pumps 19 are set at a rate of 200 ml/minute and the negative pressure in the tubular membrane units are controlled by the corresponding valve 18 and measured by the corresponding gage 20.

Nine tubular membrane units and an associated nutrient delivery system were constructed for the purpose of obtaining trial results. The trial involved the use of nine tubular membrane units, 1 meter in length, with a membrane tube diameter of 2.5 centimeters placed within an environmental growth chamber. The tubular membrane units were grouped by treatment and thirty-nine vernalized wheat seeds planted in each. The flow rate was controlled at 200 ml/minute and suction pressures set at 3.8, 7.6, and 15.2 cm of water. These were checked daily and adjusted on Monday through Friday if necessary. The nutrient solution used is listed in the table below:

| Stock Solution | g/L | (Stock) | ml Stock/L | (Working) |
|---|---|---|---|---|
| 1A | 236.15 g Ca(NO$_3$)$_2$.4H$_2$O | 1 M | 1.0 | 1 mM Ca<br>2 mM N |
| 1B | 101.11 g KNO$_3$ | 1 M | 1.0 | 1 mM K<br>1 mM N |
| 1C | 246.48 g MgSO$_4$.7H$_2$O | 1 M | 0.4 | .4 mM Mg<br>.4 mM S |
| 1D | 136.09 g KH$_2$PO$_4$ | 1 M | 0.2 | .2 mM K<br>.2 mM P |
| 2 | 4.94640 g H$_3$BO$_3$<br>1.35208 g MnSO$_4$.H$_2$O<br>0.23003 g ZnSO$_4$.7H$_2$O<br>0.05114 g CuCl$_2$.2H$_2$O<br>0.01766 g (NH$_4$)$_6$MO$_7$O$_{24}$.4H$_2$O | 80 mM B<br>8 mM Mn<br>0.8 mM Zn<br>0.3 mM Cu<br>0.1 mM Mo | 1.1<br><br>.88 uM Zn<br>.33 uM Cu | 88.0 uM B<br>8.8 uM Mn<br><br><br>.11 uM.Mo |
| 3A | 23.50 g FeEDDHA | 25 mM Fe | 1.0 | .25 uM Fe |
| 3B | 13.9 g HEDTA<br>13.5 g FeCl$_3$.6H$_2$O | 50 mM Fe | 0.5 | 25 uM Fe |
| 3C | 3.38 g FeCl$_3$.6H$_2$O | 12.5 mM Fe | 0.5 | 6.25 uM Fe |

The nutrient solution identified above was also used as a replenishment solution that was added on a daily basis as the solution level in the reservoir dropped. Samples for chemical analysis were taken from the storage carboy each time that fresh nutrient solution was made and on a weekly basis from the nutrient reservoir. Light levels were about 330 umol s$^{-1}$m$^{-2}$ at tube level and 400 at maximum canopy height. Lights were on for 18 hours and off for 6 hours with a temperature setting of 18° C. with lights on and 16° C. with lights off. Relative humidity was set at 65 %. Temperature, relative humidity and light cycle were changed to 25° C., 50 %, and continuous, respectively, on day 79. Nutrient solution pH was controlled automatically with 2 % nitric acid and daily pH conductivity, and temperature in the reservoir was recorded. Gas concentrations were at ambient and were not measured.

Water added (as nutrient solution) amounted to 257.4 liters. There was a marked increase in water uptake at about 20 days. This is to be expected as when the plants get larger, they have a greater need for water. Total water loss from the reservoir per plant was about 0.9 liters which is lower than the 2-to-3 liters per plant typically seen when using the nutrient film technique for nutrient solution delivery. Reservoir nutrient concentration over time was measured. All but nitrogen, manganese and copper showed a relatively constant level between days 20 and 50 and all exhibited a general increase in concentration toward the end of the growout, probably due to reduced uptake as a result of senescence. In general, the greatest removal of each element from solution occurred during the period of weeks 3 through 6 with a drop off and even a re-addition of some elements toward the end. Copper, however, was removed at an increasing rate between week 5 and the end. Total removal of nutrients from the reservoir on a per plant basis for the entire growout were:

Nitrogen =33.3 mg from solution, 18.0 mg from nitric acid;
Phosphorus =5.0 mg;
Potassium =50.9 mg;
Calcium =38.1 mg;
Magnesium =8.3 mg;
Iron =2.1 mg;
Manganese =0.45 mg; and
Zinc =0.040 mg.

The following two tables present the harvest data with the number of plants per unit and the mean suction pressure measured for each tubular membrane unit. Harvest variables that appear to be most affected by pressure during this experiment were: plant area, seed per head of non-primary heads, grams of seed per head of non-primary heads, plant height, and spikelet per head of non-primary heads.

EXAMPLE I

A Summary of Data Collected from the First Harvest of Wheat Grown in the Tubular Membrane Plant Growth Units

I. Physical Description and Measurements

The tubular membrane plant growth units (TMPGU) consist of a sheet of 0.45 um pore size Versapor (TM) membrane folded and stitched to form a tube and sealed along the seam with hot melt glue. Nutrient solution is pumped from a reservoir, through the tubular membrane unit, through the pump and back to the reservoir using a positive displacement pump. The surface tension of the nutrient solution prevents the solution from flowing freely out of the membrane and also prevents air from freely entering through the membrane. Capillary attraction by objects in contact with the external surface of the membrane (i.e., roots) draws the nutrient solution through the membrane in regulated amounts allowing plants to obtain required moisture and nutrients at the root/membrane interface.

In this demonstration, two TMPGU were maintained by a common nutrient reservoir. The pump used was a peristaltic pump with two pump heads to maintain separate flow through each unit. The reservoir had a capacity of approximately 14 liters and the nutrient solution was a dilute, modified Hoaglands to which Hoaglands components were added periodically.

The specifications of the TMPGU were as follows:
Physical Dimensions:
Membrane tube circumference =8.89 cm, diameter =2.83 cm,
length =30.48 cm;
Effective membrane area =270.97 cm$^2$;
Cross sectional area of membrane tube =6.29 cm$^2$;
Effective volume of membrane tube =191.72 cm$^3$;

| Harvest data I from tubular membrane experiment | | | | | | | | | |
|---|---|---|---|---|---|---|---|---|---|
| Mean pressure cm of water | Range | # of plants | Seed* | Straw* | Root* | Chaff* | % seed biomass | Height (mm) | Plant area |
| 4.27 | 2.29–8.38 | 25 | 29.04 | 12.35 | 6.65 | 9.19 | 51.7 | 503.1 | 37.3 |
| 4.45 | 3.05–5.33 | 25 | 45.11 | 25.43 | 6.89 | 13.25 | 49.7 | 515.8 | 42.6 |
| 4.62 | 3.05–8.38 | 35 | 56.11 | 26.50 | 7.82 | 17.78 | 51.9 | 491.0 | 54.1 |
| 9.50 | 3.81–25.40 | 39 | 48.40 | 22.29 | 7.92 | 5.95 | 57.2 | 459.5 | 25.0 |
| 8.59 | 6.10–25.40 | 39 | 39.07 | 19.78 | 6.65 | 10.56 | 51.4 | 467.2 | 34.1 |
| 8.08 | 5.84–10.67 | 28 | 37.71 | 19.20 | 5.37 | 31.88 | 40.0 | 490.0 | 38.4 |
| 17.07 | 11.43–33.02 | 32 | 33.88 | 14.33 | 5.73 | 10.66 | 52.4 | 475.3 | 29.6 |
| 17.42 | 14.73–38.10 | 30 | 41.84 | 16.30 | 7.44 | 12.75 | 53.4 | 457.5 | 21.2 |
| 16.41 | 12.19–38.10 | 30 | 34.20 | 17.44 | 9.29 | 14.30 | 45.5 | 453.7 | 25.6 |

*dry weight (grams)

| Harvest data II from tubular membrane experiment | | | | | | | | | | |
|---|---|---|---|---|---|---|---|---|---|---|
| Mean pressure cm of Water | Range | # heads | | Seeds/head | | Mass/seed* | | Seed mass/ head* | | Spikelets | |
| | | prim | other | prim | other | prim | other | prim | other | prim | other |
| 4.27 | 2.29–8.38 | 25 | 8 | 28.5 | 18.9 | .034 | .031 | .972 | .593 | 13.7 | 14.9 |
| 4.45 | 3.05–5.33 | 25 | 23 | 25.9 | 28.2 | .035 | .034 | .914 | .968 | 14.2 | 14.0 |
| 4.62 | 3.05–8.38 | 35 | 20 | 31.9 | 25.6 | .034 | .035 | 1.087 | .903 | 15.0 | 16.4 |
| 9.50 | 3.81–25.40 | 39 | 10 | 29.9 | 25.7 | .035 | .032 | 1.031 | .819 | 13.0 | 14.8 |
| 8.59 | 6.10–25.40 | 39 | 8 | 27.2 | 23.7 | .032 | .028 | .865 | .667 | 14.3 | 15.4 |
| 8.08 | 5.84–10.67 | 28 | 12 | 32.3 | 25.2 | .033 | .028 | 1.049 | .695 | 14.4 | 15.3 |
| 17.07 | 11.43–33.02 | 32 | 8 | 22.7 | 18.2 | .040 | .031 | .916 | .571 | 11.7 | 13.0 |
| 17.42 | 14.73–38.10 | 30 | 7 | 34.7 | 16.6 | .037 | .030 | 1.280 | .491 | 14.5 | 13.0 |
| 16.41 | 12.19–38.10 | 30 | 10 | 28.3 | 13.8 | .035 | .032 | .992 | .444 | 14.8 | 12.9 |

*grams

The following examples show the operation of various embodiments of the present invention.

PVC pipe internal diameter = 3.18 cm
Internal cross sectional area of pipe = 7.92 cm$^2$
Internal volune of pipe = 241.40 cm$^3$
Effective internal root space = 49.68 cm$^3$ (241.40 cm$^3$−191.72cm$^3$)

TMPGU with holes (6.35 mm diameter) had six plants germinate and grow out, while the one with the slit (3.18 mm width) had nine plants germinate and grow out.

TMPGU (holes) root space available/plant:
cavity volume = 8.28 cm$^3$, membrane area = 45.16 cm$^2$ TMPGU (slit) root space available/plant:
cavity volume = 5.52 cm$^3$, membrane area = 30.10 cm$^2$;

Pumping rates/flow:
Flow = 100 ml/min = 144 l/day = 9792 l/68 days

II Experimental Procedure/Protocol

The set-up involved construction of the TMPGU's as described previously. These were connected to pumps using transparent Tygon (TM) tubing which allowed visual monitoring to insure that flow was maintained. The reservoir was filled and the membranes were wetted and the pump was started. Flow rate was measured and tubing and connections were checked for leaks. Sterile and vernalized (two days) Yecora Rojo wheat seeds were planted in each unit, within the holes and within the slit respectively. These were covered with a damp paper towel and opaque plastic. Seven seeds germinated in the holes and nine within the slit. Black vinyl tape was used to cover the slit between plants following emergence from the slit. The nutrient solution was checked daily for pH and 10 % HNO$_3$ was added when necessary to maintain the pH between 5.5 and 6.5. Nutrient additions took place on days 7, 25, 43, and 58. The nutrient changes in the reservoir during those periods are presented in Table 1. These values were calculated using values from samples taken at the end of each period and the amount added at the beginning of each period. The first time period (0–25 days) coincided with the vegetative and induction and extension periods of the life cycle. The remaining time periods (26–43 days) coincided with the extension, pollination and seed fill periods. The actual accepted values are days 0z–12 (vegetative), 12–18 (induction), 18–30 (extension), 30-34 (pollination) and 34–65 (seed fill and senescence) for wheat grown under continuous lighting and at 27° C. The wheat grown in the TMPGU was kept under continuous light at about 350-450 um/m$^2$/s, 230C and 50-60 % relative humidity. The plants were harvested on day 69.

TABLE I
CHANGES IN NUTRIENT SOLUTION

| Parameters | Change/day/plant* | | | |
|---|---|---|---|---|
|  | 8–26 | 26–44 | 44–59 | 56–69 |
| N** (mg) | 1.53 | 1.86 | 2.63 | −2.10 |
| P (mg) | 4.03 | 1.41 | 2.16 | −2.80 |
| K (mg) | 1.63 | 2.92 | 1.37 | −7.24 |
| Ca (mg) | 1.59 | −.16 | 2.86 | −6.3 |
| Mg (mg) | .20 | .32 | .28 | −.79 |
| Fe (mg) | .011 | .055 | .030 | .03 |
| S (mg) | .28 | .25 | 1.15 | −.87 |
| Cu (mg) | 0 | −.0005 | .0006 | −.001 |
| Mn (mg) | .0062 | −.001 | .001 | .023 |
| Zn (mg) | — | −.005 | .002 | −.0015 |

*A negative value indicates an increase in the concentration of this parameter during the given time period.
**Includes nitrogen added with the addition of 10% HNO$_3$ for pH adjustment.

III. Harvest Protocol

Procedures for wheat harvest were followed according to a harvest protocol. Data collected from the harvest was compiled and summarized.

Wheat Harvest Protocol

1. Stop flow through pipes.
2. Remove pipes and contents for examination.
3. Photograph:
   Wheat shoots—side view, spike closeup;
   Wheat roots—side view around membrane.
4. Measure height of each plant.
5. Cut wheat stalks from root mass.
6. With scissors separate each spike from stalk.
7. Count total number of primary, secondary and tertiary spikes per plant.
8. Weigh primary, secondary and tertiary spikes.
9. Count spikelets per spike.
10. Remove and count seeds per spike (save the combined chaff for drying).
11. Place seed in respective piles and take 5 g samples of each of the three groups for drying.
12. Blot roots with paper towel and weigh total root mass.
13. Weigh total mass of excised wheat stalks.
14. Dry in oven at 70° C.;
   A. Seed samples
   B. Chaff
   C. Stalks
   D. Roots
   E. Weigh at 24 hours and again at 48 hours.
15. From above, calculate and summarize harvest data.

IV. Harvest Data

Table 2 presents the weights and measurements made on the plants grown in the TMPGU.

V. Harvest Summary

An area of 0.01 m$^2$ was calculated for each tube. Productivity data from the tubular membrane system is compared with data from different environments in Table 3.

While this data would be more meaningful if the experiment is repeated with a greater number of plants than was done for this study, the preliminary results show that the seed yield is approximately ⅔ of its potential. Also by looking at harvest index, it is seen that a large portion of the plants' biomass is in the seeds.

TABLE 2

TUBULAR MEMBRANE UNIT WHEAT HARVEST DATA
April 16, 1986
(68 days)

| Parameter | Pipe with holes | | | Pipe with slit | | |
|---|---|---|---|---|---|---|
| | Prim | Second | Tert | Prim | Second | Tert |
| Plants/$m^2$ | 600 | — | — | 900 | — | — |
| # heads | 6 | 9 | 6 | 9 | 14 | 7 |
| Heads/$m^2$ | 600 | 900 | 600 | 900 | 1400 | 700 |
| Head mass | 6.61 | 11.71 | 6.00 | 12.49 | 18.03 | 5.63 |
| Spikelet # | 65 | 100 | 65 | 102 | 148 | 62 |
| Spikelet/$m^2$ | 6500 | 10,000 | 65,000 | 102,000 | 148,000 | 6200 |
| Spikelets/head | 10.83 | 11.10 | 10.83 | 11.33 | 10.57 | 8.86 |
| Seed # | 118 | 155 | 87 | 212 | 284 | 59 |
| Seed mass | 4.82 | 6.74 | 3.73 | 8.80 | 12.32 | — |
| Seed mass/$m^2$ | 482 | 674 | 373 | 880 | 1232 | — |
| Mass/seed | 0.041 | 0.043 | 0.043 | 0.042 | 0.043 | — |
| Seeds/head | 19.67 | 17.22 | 14.50 | 23.56 | 20.29 | — |
| Height (mm) | 362 | — | — | 413 | — | — |
| % root mass | 19 | — | — | 19 | — | — |
| Harvest index | 70 | — | — | 54 | — | — |
| Fresh weight* | | | | | | |
| Stems | 13.24 | | | 19.72 | | |
| Chaff | 4.80 | | | 7.50 | | |
| Roots | 30.27 | | | 46.95 | | |
| Dry weight* | | | | | | |
| Stems | 3.0 | | | 6.30 | | |
| Chaff | 2.0 | | | 4.20 | | |
| Roots | 4.9 | | | 7.40 | | |
| % Moisture | | | | | | |
| Seeds | 8 | 21 | 42** | 16 | 14 | |
| Stems | 341 | | | 213 | | |
| Chaff | 140 | | | 79 | | |
| Roots | 518 | | | 534 | | |

*Combined primary, secondary and tertiary
**Tertiary seeds combined holes and slit.

TABLE 3

A comparison of wheat productivities in different environments

| | Absolute seed yield $gm^{-2}$ | Life Cycle days | Yield per day $gm^{-2}d^{-1}$ | Total Biomass $gm^{-2}$ $gm^{-2}d^{-1}$ | Biomass per day | Harvest Index % |
|---|---|---|---|---|---|---|
| Field prod'n | 300–700 | 90–130 | 3–7 | 700–1800 | 7–18 | 45 |
| World record in field[1] | 1450 | 120 | 12.1 | 3200 | 27 | 45 |
| Utah State Univ. controlled environment | 1200 | 56 | 21.4 | 5000 | 89 | 24 |
| Russian life support system study[2] | 1000 | 56 | 17.9 | 2860 | 51 | 35 |
| TMPGU pipe[3] with holes | 1529 | 68 | 22.5 | 2519 | 37 | 70 |
| TMPGU pipe[3] with slits | 2112 | 68 | 31.1 | 3902 | 57 | 54 |
| KSC DELSS (trays) | 383 | 73 | 5.2 | 1011 | 14 | 38 |

[1]Winter wheat (sown in autumn: actually in the field about 270 days.
[2]Achieved with 50 percent of Utah State Univ. energy input (Gitel'zon 1977).
[3]Values based on one tube each slits and holes.

IV. Microbiological Assays at Harvest

Sample Collection

During harvest of the wheat plants the following samples were aseptically collected into 5 ml of sterile physiological saline for microbiological analysis:
1. Two root sections from the slitted pipe and one from the hole.
2. An obviously decayed seed remnant.
3. Slime layer covering the Tygon (TM) tubing submersed in the reservoir nutrient solution.
4. Algal macro-colony from the reservoir bottom.
5. Two swabs of the interior membrane surface of the slotted pipe and one swab of the interior membrane surface of the hole pipe. The approximate membrane area sampled was 12 square cm.

Sample Processing

All samples were sonicated for 6.0 minutes to disperse bacteria attached to surfaces and to disrupt microcolonies. Total viable bacteria in the sonicated samples were enumerated using the spread plate technique onto nutrient agar plates. Plates were incubated for five days at 28° C. prior to counting.

Results and Discussion

Root samples from the slitted pipe had $14 \times 10^9$ and $1.6 \times 10^9$ bacteria per g dry weight of root material whereas the roots from the hole pipe had $1.8 \times 10^9$ per g. This shows considerable variation. In comparison, roots from tray experiments usually have $10^9$ to $10^{10}$ bacteria per gram.

This decaying seed contained $8.4 \times 10^7$ bacteria. The slime attached to the Tygon (TM) tube in the reservoir had approximately $3.8 \times 10^6$ bacteria per square cm of tubing area. The other sample from the reservoir was a large algal colony, which contained approximately $9 \times 10^6$ bacteria per ml of algae. However, disruption of the macrocolony by the sonication treatment was inadequate, with large particles remaining. Supposedly, the attached bacteria were also not dispersed adequately.

The most interesting samples were those collected by swabbing the interior of the membrane tube. The surface of the slitted pipe membrane contained 3.3 and $8.4 \times 10^5$ per square cm of membrane for the two samples collected. For the hole pipe, the count was $1.4 \times 10^6$ per square cm. All three samples contained numerous senescent colonies of the same alga that occurred in the reservoir. This organism, a unicellular green alga, has yet to be identified.

EXAMPLE II

I. Methods and Materials

The tubes were constructed according to procedures described above. Two tubular units, one of each of the two pore sizes (0.2 and 0.45 micron) were connected to a two-head peristaltic pump, each to an individual head. Four pumps were used to operate eight tubular units during this study. A 25 liter reservoir was used to contain the modified Hoagland's solution which supplied the water and nutrients to the plants. The solution was aerated using an aquarium air pump. The nutrient solution was pumped through the system at a rate of 100 ml/min/tube. Nineteen wheat seeds (cultivar: Yecora rojo) were placed in each tubular unit for germination and grow-out. The pH, which tended to go basic, was maintained in the range of 5.8–6.0 by adding dilute nitric acid with a controller which automatically monitored the pH of the nutrient solution. The entire growth unit was placed in an environmental plant growth chamber at 23° C. and 65 % relative humidity with constant light at about 300 umho/cm$^2$/sec.

Deionized water was used to germinate the plants. Stock nutrient solutions were added following germination, on days 6, 10, 20, 31, 48 and 63. The totals of each element and water added to the solution during this experiement are presented in Table 4.

Mature wheat plants were harvested on day 70. Harvest included the disassembly of the entire system for removal of the plants. Plant heights were measured and the total number of plants counted. The number of seeds were counted per head. Root, stem, chaff and seed were separated. Biomass was placed in paper bags for weighing. Oven dry weights were determined for each category of biomass after drying in a forced air oven at 70° C. for 12–18 hours.

One-way analysis of variance (ANOVA) was performed using SPSS (1986) to test the effects of pore size differences for 1) the number of seeds per primary head, 2) the plant height, and 3) mean seed weight per head.

II. Results and Discussion

Germination and growth proceeded normal through harvest with six of the eight units. On day 42, it was noted that the plants were dessicated in two of the units, due to failure of the pump tubing in the corresponding peristaltic pump heads.

TABLE 4

A list of the amount of each element and water added during growout and remaining in the reservoir at harvest.

| Element | Amount Added[1] | Amount Remaining[2] |
|---|---|---|
| Nitrogen | 8.97 g | 2.20 g |
| Phosphorus | .853 g | .420 g |
| Potassium | 6.28 g | .820 g |
| Calcium | 4.98 g | 1.43 g |
| Magnesium | 1.29 g | .315 g |
| Iron | 138.0 mg | 43.3 mg |
| Sulfur | 1.70 g | * |
| Copper | .810 mg | ND |
| Manganese | 18.7 mg | .167 mg |
| Molybdenum | 2.85 mg | * |
| Zinc | 2.22 mg | ND |
| Deionized water | 140 liters | 25 liters |

[1]Calculated from volume of stock solutions added
[2]Calculated from analysis of nutrient solution at harvest
*Not analyzed
ND—not detected The root mass formed a continuous mat around the membrane but was easily separated. All tubes exhibited alga growth within the slot area where light was able to penetrate to the membrane surface. The harvest data are presented in Table 5.

The one-way ANOVA performed on the data showed no differences in the number of primary seed per plant, plant height, and mean seed weight per head between the pore sizes. The results of the ANOVA tests and supplementary statistics appear in Tables 6, 7 and 8.

Seed was produced at a rate better than expected under field conditions with total biomass in the range of expected field production (Table 9). The harvest index (edible/total biomass) was as good or better than expected. It was better than that previously reported for other hydroponic systems (Table 9).

Visual inspection of the root mass showed that about two-thirds of the surface of the membrane was not covered by the roots which may indicate the possibility of using a higher density of plants in the tubes.

The indication from this experiment that there is no significant different in production between pore sizes permits making a choice using another criteria. Since the 0.2 micron pore size would create a more effective barrier to bacteria transfer from solution to root or vice versa, it may be more desirable to use the smaller pore size.

TABLE 5

| Stalk (Tiller) | Tubular membrane wheat harvest data | | | | | |
|---|---|---|---|---|---|---|
| | Pore Size Tube # 0.2 um (1,3,5,7) | | | Pore Size Tube # 0.45 um (4,8) | | |
| | Prim | Second | Tert | Prim | Second | Tert |
| Plants/m$^2$ | 850 | — | — | 725 | — | — |
| # heads | 68 | 44 | 4 | 29 | 18 | 0 |
| Heads/m$^2$ | 850 | 550 | 50 | 725 | 450 | 0 |
| Seed # | 1338 | 580 | 50 | 597 | 240 | 0 |
| Seed mass | 50.0 | 18.3 | 1.70 | 23.9 | 8.20 | 0 |
| Seed mass/m$^2$ | 625 | 229 | 21.3 | 598 | 205 | 0 |
| Mass/seed | 0.037 | 0.032 | 0.034 | 0.040 | 0.034 | — |
| Seeds/head | 19.7 | 13.2 | 12.5 | 20.6 | 13.3 | — |
| Height (mm) | 400 | — | — | 405 | — | — |
| % root mass | 14.2 | — | — | 19.1 | — | — |

TABLE 5-continued

Tubular membrane wheat harvest data

| Stalk (Tiller) | Pore Size Tube # 0.2 um (1,3,5,7) | | | Pore Size Tube # 0.45 um (4,8) | | |
|---|---|---|---|---|---|---|
| | Prim | Second | Tert | Prim | Second | Tert |
| Harvest index Dry weight* | 45 | — | — | 49.5 | — | — |
| Seeds | 39.1 | | | 15.8 | — | — |
| Chaff | 23.9 | | | 9.5 | — | — |
| Roots | 21.8 | | | 9.3 | — | — |
| % Moisture | | | | | | |
| Seeds | 39.1 | 31.8 | 41.9 | 13.6 | 36.5 | — |

*Combined primary, secondary and tertiary

TABLE 6

Experiment on tubular membrane system.

Variable: Seed Number/Primary Head
By Variable: Pore Size in Microns (1 = 0.20, 2 = 0.45)

| Source | D.F. | Sum of Squares | Mean Squares | F Ratio | F Prob. |
|---|---|---|---|---|---|
| Between Groups | 1 | 3.6429 | 3.6429 | .2199 | .6402 N.S. |
| Within Groups | 94 | 1556.8571 | 16.5623 | | |
| Total | 95 | 1560.5000 | | | |

| Group | Count | Mean | Standard Deviation | Standard Error | 95% Conf. Int for Mean | Minimum | Maximum |
|---|---|---|---|---|---|---|---|
| 1 | 68 | 20.2500 | 4.2685 | .5176 | 19.2168 to 21.2832 | 11.0000 | 29.0000 |
| 2 | 28 | 20.6786 | 3.5282 | .6668 | 19.3105 to 22.0467 | 13.0000 | 29.0000 |
| Total | 96 | 20.3750 | 4.0529 | .4137 | 19.5538 to 21.1962 | 11.0000 | 29.0000 |

Tests for Homogenity of Variances
Cochrans C = max. variance/sum(variances) = .5941, P = .195 (approx.)
Bartlett = Box F = 1.300, P = .254
Maximum variance/minimum variance 1.464

TABLE 7

Experiment on tubular membrane system

Variable: Plant Height
By Variable: Pore Size in Microns (1 = 0.20, 2 = 0.45)

| Source | D.F. | Sum of Squares | Mean Squares | F Ratio | F Prob. |
|---|---|---|---|---|---|
| Between Groups | 1 | 1.0163 | 1.0163 | .6268 | .4305 N.S. |
| Within Groups | 94 | 152.4206 | 1.6215 | | |
| Total | 95 | 153.4368 | | | |

| Group | Count | Mean | Standard Deviation | Standard Error | 95% Conf Int for Mean | Minimum | Maximum |
|---|---|---|---|---|---|---|---|
| 1 | 68 | 15.7647 | 1.4220 | .1724 | 15.4205 to 16.1089 | 10.0000 | 18.0000 |
| 2 | 28 | 15.9911 | .7920 | .1497 | 15.6840 to 16.2982 | 13.7500 | 17.2500 |
| Total | 96 | 15.8307 | 1.2709 | .1297 | 15.5732 to 16.0882 | 10.0000 | 18.0000 |

Tests for Homegeneity of Variances
Cochrans C = max. variance/sum(variances) = .7633, P = .000(approx.)
Bartlett = Box F = 10.708, P = .001
Maximum variance/minimum variance 3.224

TABLE 8

Experiment on tubular membrane system

Variable: Mean Seed Weight/Plant
By Variable: Pore Size in Microns (1 = 0.20, 2 = 0.45)

| Source | D.F. | Sum of Squares | Mean Squares | F Ratio | F Prob. |
|---|---|---|---|---|---|
| Between Groups | 1 | .0862 | .0862 | 2.4982 | .1173 N.S. |
| Within Groups | 94 | 3.2423 | .0345 | | |
| Total | 95 | 3.3284 | | | |

| Group | Count | Mean | Standard Deviation | Standard Error | 95% Conf Int for Mean | Minimum | Maximum |
|---|---|---|---|---|---|---|---|
| 1 | 68 | 1.0430 | .1731 | .0210 | 1.0011 to 1.0849 | .8300 | 1.2500 |
| 2 | 28 | 1.1089 | .2139 | .0404 | 1.0260 to 1.1919 | .9400 | 1.3700 |
| Total | 96 | 1.0622 | .1872 | .0191 | 1.0243 to 1.1002 | .8300 | 1.3700 |

Tests for Homogeneity of Variances
Cochrans C = max. variance/sum(variances) = .6042, P = .151(approx.)
Bartlett = Box F = 1.793, P = .181
Maximum variance/minimum variance 1.526

TABLE 9

A comparison of wheat productivities in different environments

| | Absolute seed yield gm$^{-2}$ | Life Cycle days | Yield per day gm$^{-2}$d$^{-1}$ | Total Biomass gm$^{-2}$ | Biomass per day gm$^{-2}$d$^{-1}$ | Harvest Index % |
|---|---|---|---|---|---|---|
| Field prod'n | 300–700 | 90–130 | 3–7 | 700–1800 | 7–18 | 45 |
| World record in field[1] | 1450 | 120 | 12.1 | 3200 | 27 | 45 |
| Utah State Univ. controlled environment | 1200 | 56 | 21.4 | 5000 | 89 | 24 |
| Russian life support system study[2] | 1000 | 56 | 17.9 | 2860 | 51 | 35 |
| TMPGU pipe[3] (0.2 um pore size) | 875 | 70 | 12.5 | 1935 | 28 | 45 |
| TMPGU pipe[3] (0.2 um pore size) | 837 | 70 | 12.0 | 1668 | 24 | 50 |
| KSC DELSS (trays) | 661 | 65 | 10.2 | 1726 | 27 | 38 |

[1]Winter wheat (sown in autumn: actually in the field about 270 days.
[2]Achieved with 50 percent of Utah State Univ. energy input (Gitel'zon 1977).
[3]Tubular units used in this study.
[4]Tray units used in other KSC CELSS studies. Values based on one tube each slits and holes.

From the above detailed description, it will be apparent that there has been provided an improved process and apparatus for hydroponic growth. It should be understood that the described and disclosed embodiments and examples are merely exemplary of the invention and that all embodiments are intended to be included that do not depart from the spirit of the invention and the scope of the appended claims;

I claim:

1. In a method of hydroponic growth of a plant from seed and a nutrient solution, said method comprising the steps of supporting the seed and subsequent plant roots directly on a microporous membrane and supplying liquid nutrients to said seed and subsequent plant roots by migration through said membrane, the improvement comprising the steps of:

providing a section of rigid tubular pipe defining an opening in its walls;

supporting a seed and subsequent plant roots directly on a tubular hydrophilic microporous membrane telescopically received inside of said pipe, said tubular membrane and said tubular pipe being provided in a spaced telescopic arrangement to provide a sufficient air space without a growing medium therebetween for said seed and subsequent plant roots to be positioned directly on said membrane adjacent to said opening so that the stem of said plant can grow outwardly through said opening and the roots of said plant supported between said tubular pipe and said tubular membrane can grow unimpeded and in contact with said membrane such that the seed and subsequent plant root are held in the air space between the exterior of said membrane and interior of said tubular pipe, the pores in said membrane being sized to be sealed by surface tension of said solution provided along the length of said tubular membrane except where said roots contact said membrane whereby said solution only flows through said membrane when in contact with said roots by capillary action to said roots;

supporting said membrane in a circumferentially spaced relationship to the interior of said rigid pipe;

providing a nutrient solution at one end of said tubular membrane; and removing nutrient solution from the other end of said tubular membrane.

2. The method of claim 1 wherein said tubular membrane has a pore size from about 0.2 to about 0.45 microns.

3. A method of hydroponic growth as claimed in claim 1 wherein said removing step includes the drawing of the solution from said tubular membrane so that a negative pressure of the solution is maintained in said tubular membrane.

4. The method of claim 1 wherein said seed is wheat.

5. In a method of hydroponic growth of a plant from seed and a nutrient solution, said method comprising the steps of supporting the seed and subsequent plant roots directly on a microporous membrane and supplying liquid nutrients to said seed and subsequent plant roots by migration through said membrane, the improvement comprising the steps of:

providing a section of rigid tubular pipe defining an opening in its walls;

supporting a seed and subsequent plant roots directly on said membrane which is in tubular form and is telescopically received inside of said pipe, said membrane and said tubular pipe being provided in a spaced telescopic arrangement to provide a sufficient air space without a growing medium therebetween for said seed and subsequent plant roots to be positioned directly on said membrane adjacent to said opening so that the stem of said plant can grow outwardly through said opening and the roots of said plant supported between said tubular pipe and said tubular membrane can grow unimpeded and in contact with said membrane such that the seed and subsequent plant roots are held in the air space between the exterior of said membrane and interior of said tubular pipe, the pores in said membrane being sized to be sealed by surface tension of said solution provided along the length of said tubular membrane except where said seed and subsequent plant roots contact said membrane whereby said solution only flows through said membrane when in contact with said seed and subsequent plant roots by capillary action to said seed and subsequent plant roots;

supporting said membrane in a circumferentially spaced relationship to the interior of said rigid pipe;

providing a nutrient solution at one end of said tubular membrane; and removing nutrient solution from the other end of said tubular membrane.

6. The method of claim 5 wherein said tubular membrane has a pore size from about 0.1 to about 20 microns.

7. A method of hydroponic growth as claimed in claim 5 wherein said removing step includes the drawing of the solution from said tubular membrane so that a negative pressure of the solution is maintained in said tubular membrane.

8. In an apparatus for hydroponic growth of a plant from seed and a nutrient solution:

a section of rigid tubular pipe defining an opening in its wall;

a rigid tubular, hydrophilic, microporous member telescopically received inside of said pipe, said rigid tubular member and said tubular pipe being provided in a spaced telescopic arrangement to provide a sufficient air space without a growing medium therebetween for a seed to be positioned directly on said member adjacent to said opening so that the stem of said plant can grow outwardly through said opening and the roots of said plant supported between said tubular pipe and said tubular member can grow unimpeded and in contact with said member such that the roots are held in the air space between the exterior of said member and the interior of said tubular pipe, the pores in said member being sized to be sealed by surface tension of said solution provided along the length of said tubular member except where said roots contact said member whereby said solution flows through said member when in contact with said roots by capillary action to said roots;

a support means to support said member in a spaced relationship to the interior of said rigid pipe;

inlet means connected to one end of said tubular member adapted to receive said nutrient solution; and outlet means connected to the other end of said tubular member adapted to remove said nutrient solution.

9. The invention of claim 8, wherein said section of rigid tubular pipe defines an opening in the form of a continuous slit parallel to the axis of said pipe.

10. The invention of claim 8, wherein said section of rigid tubular pipe defines a plurality of openings in the form of holes spaced parallel to the axis of said pipe.

11. The invention of claim 8, wherein said rigid tubular member has a pore size from about 0.1 to about 20 microns.

12. The invention of claim 8, wherein said support means includes a tubular segment telescopically received inside of said pipe and surrounding said rigid tubular member.

13. The invention of claim 8 wherein said rigid tubular porous member is plastic.

14. The invention of claim 8 wherein said rigid tubular porous member is ceramic.

15. The invention of claim 8 wherein said rigid tubular porous member is metallic.

16. The invention of claim 8 and further including a pressure control means for creating a negative pressure of the solution in said tubular member as the solution moves from said inlet means to said outlet means.

17. In an apparatus for hydroponic growth of a plant from seed and a nutrient solution:

a section of rigid tubular pipe defining an opening in its wall;

a tubular hydrophilic, microporous membrane telescopically received inside of said pipe, said tubular membrane and said tubular pipe being provided in a spaced telescopic arrangement to provide a sufficient air space without a growing medium therebetween for a seed to be positioned directly on said membrane adjacent to said opening so that the stem of said plant can grow outwardly through said opening and the roots of said plant supported between said tubular pipe and said tubular membrane can grow unimpeded and in contact with said membrane such that the roots are held in the air space between the exterior of said membrane and interior of said tubular pipe, the pores in said membrane being sized to be sealed by surface tension of said solution provided along the length of said tubular membrane except where said roots contact said membrane whereby said solution only flows through said membrane when in contact with said roots by capillary action to said roots;

a support means telescopically received inside said membrane to support said membrane in a spaced relationship to the interior of said rigid pipe;

inlet means connected to one end of said tubular membrane adapted to receive said solution; and outlet means connected to the other end of said tubular membrane adapted to remove said nutrient solution.

18. The invention of claim 17, wherein said section of rigid tubular pipe defines an opening in the form of a continuous slit parallel to a longitudinal axis of said pipe.

19. The invention of claim 17, wherein said section of rigid tubular pipe defines a plurality of openings in the form of holes spaced paralled to a longitudinal axis of said pipe.

20. The invention of claim 17 wherein said tubular hydrophilic, microporous membrane has a pore size from about 0.2 to about 0.45 microns.

21. The invention of claim 17, wherein said support means includes a tubular plastic screen.

22. The invention of claim 17, wherein said support means includes a rigid tube with openings in its wall.

23. The invention of claim 17, wherein said rigid tubular pipe is a normal diameter 1¼ PVC pipe and said inlet and outlet means each are comprised of a PVC pipe-to-tube fitting and a PVC pipe fitting with a hose nipple.

24. The invention of claim 23, wherein each end of said tubular hydrophilic, microporous membrane is securely interposed between the exterior of said pipe fitting and the interior of said pipe-to-tube fitting.

25. The invention of claim 24, wherein said hydrophilic, microporous membrane is cemented to said pipe-to-tube fitting.

26. The invention of claim 17 and further including a pressure control means for creating a negative pressure of the solution in said tubular membrane as the solution moves from said inlet means to said outlet means.

27. In an apparatus for hydroponic growth of a plant from seed and a nutrient solution:
a section of rigid tubular nominal diameter 1¼" PVC pipe having longitudinally spaced openings in its wall;
a tubular hydrophilic, microporous membrane which has a pore size from about 0.2 to about 0.45 microns and is telescopically received inside of said pipe, said tubular membrane and said tubular pipe being provided in a spaced telescopic arrangement to provide a sufficient air space without a growing medium therebetween for a seed to be positioned directly on the exterior of said membrane adjacent to any one of said openings so that the stem of said plant can grow through said opening and the roots of said plant supported between said tubular pipe and said tubular membrane can grow unimpeded and in contact with said membrane such that the roots are held in the air space between the exterior of said membrane and the interior of said tubular pipe, the pores in said membrane being sized to be sealed by surface tension of said solution provided along the length of said tubular membrane except where said roots contact said membrane whereby said solution only flows through said membrane when in contact with said roots by capillary action to said roots;
a tubular plastic screen telescopically received inside of said membrane to support said membrane in a spaced relationship with the interior surface of said rigid pipe;
inlet and outlet means connected to the ends of said tubular membrane adapted for receiving and removing a nutrient solution, said inlet and outlet means each including a PVC pipe-to-tube fitting telescopically received in an end of said PVC pipe and a PVC pipe fitting with a hose nipple, said fitting being telescopically received in the interior of said PVC pipe-to-tube fitting.

28. The invention of claim 27 and further including a pressure control means for creating a negative pressure of the solution in said tubular membrane as the solution moves from said inlet means to said outlet means.

29. In an apparatus for hydroponic growth of a plant from seed and a nutrient solution:
a section of rigid tubular nominal diameter 1¼" PVC pipe having a longitudinal slit in its wall;
a tubular hydrophilic, microporous membrane which has a pore size from about 0.2 to about 0.45 microns and is telescopically received inside of said pipe, said tubular membrane and said tubular pipe being provided in a spaced telescopic arrangement to provide a sufficient air space without a growing medium therebetween for a seed to be directly positioned on the exterior of said membrane adjacent to any one of said openings so that the stem of said plant can grow through said opening and the roots of said plant supported between said tubular pipe and said tubular membrane can grow unimpeded and in contact with said membrane such that the roots are held in the air space between the exterior of said membrane and the interior of said tubular pipe, the pores in said membrane being sized to be sealed by surface tension of said solution provided along the length of said tubular membrane except where said roots contact said membrane whereby said solution only flows through said membrane when in contact with said roots by capillary action to said roots;
a tubular plastic screen telescopically received inside of said membrane to support said membrane in a spaced relationship with the interior surface of said rigid pipe;
inlet and outlet means connected to the ends of said tubular membrane adapted for receiving and removing a nutrient solution, said inlet and outlet means each including a PVC pipe-to-tube fitting telescopically received in an end of said PVC pipe and a PVC pipe fitting with a hose nipple, said fitting being telescopically received in the interior of said PVC pipe-to-tube fitting.

30. The invention of claim 29, and further including a pressure control means for creating a negative pressure of the solution in said tubular membrane as the solution moves from said inlet means to said outlet means.

31. A plant nutrient delivery system comprising a plurality of devices adapted for hydroponic growth of a plant from seed and a nutrient solution, each device having
a section of rigid tubular pipe defining an opening in its walls; a tubular hydrophilic, microporous wall means telescopically received inside of said pipe, said tubular wall means and said tubular pipe being provided in a spaced telescopic arrangement to provide a sufficient air space without a growing medium therebetween for the seed to be positioned directly on said hydrophilic, microporous wall means adjacent to said opening so that the stem of said plant can grow outwardly through said opening and the roots of said plant supported between said tubular pipe and said tubular wall means can grow unimpeded and in contact with said wall means such that the roots are held in the air space between the exterior of said wall means and interior of said tubular pipe the pores in said wall means being sized to be sealed by surface tension of said solution provided along the length of said tubular wall means except where said roots contact said wall means whereby said solution only flows through said wall means when in contact with said roots by capillary action to said roots; inlet means connected to one end of said tubular wall means adapted to receive a nutrient solution; and outlet means connected to the other end of said tubular wall means adapted to remove nutrient solution, the inlet means of each device being connected to a respective valve means which are connected to a manifold pipe means having standpipe means for control of the pressure head of nutrient solution to said devices and the outlet means of each device being connected downstream to a peristaltic pump which creates a negative pressure in said tubular wall means as said pump draws the nutrient solution from said valve means and through said tubular wall means to said outlet means whereby the solution is readily maintained in said wall means by surface tension and only passes therethrough when said root contacts the wall means and draws the solution thereto by capillary action.

32. The invention of claim 31; wherein a vacuum monitoring means is connected to the inlet means of each device.

33. The invention of claim 31, wherein nine said devices are provided.

* * * * *